Figure 1:
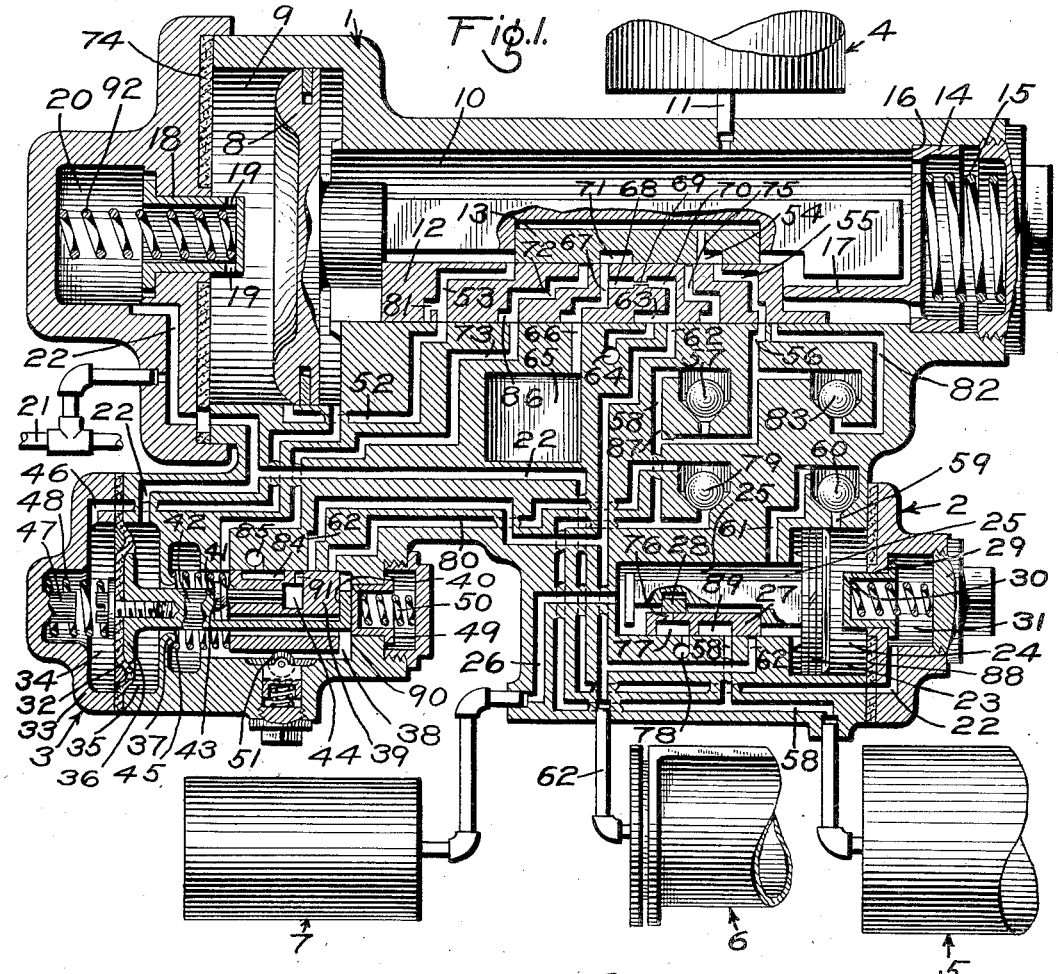

March 10, 1936.  C. C. FARMER  2,033,462

FLUID PRESSURE BRAKE

Filed July 14, 1931   2 Sheets-Sheet 1

INVENTOR.
CLYDE C. FARMER
By *Wm. W. Cady*
ATTORNEY.

March 10, 1936.  C. C. FARMER  2,033,462
FLUID PRESSURE BRAKE
Filed July 14, 1931   2 Sheets-Sheet 2
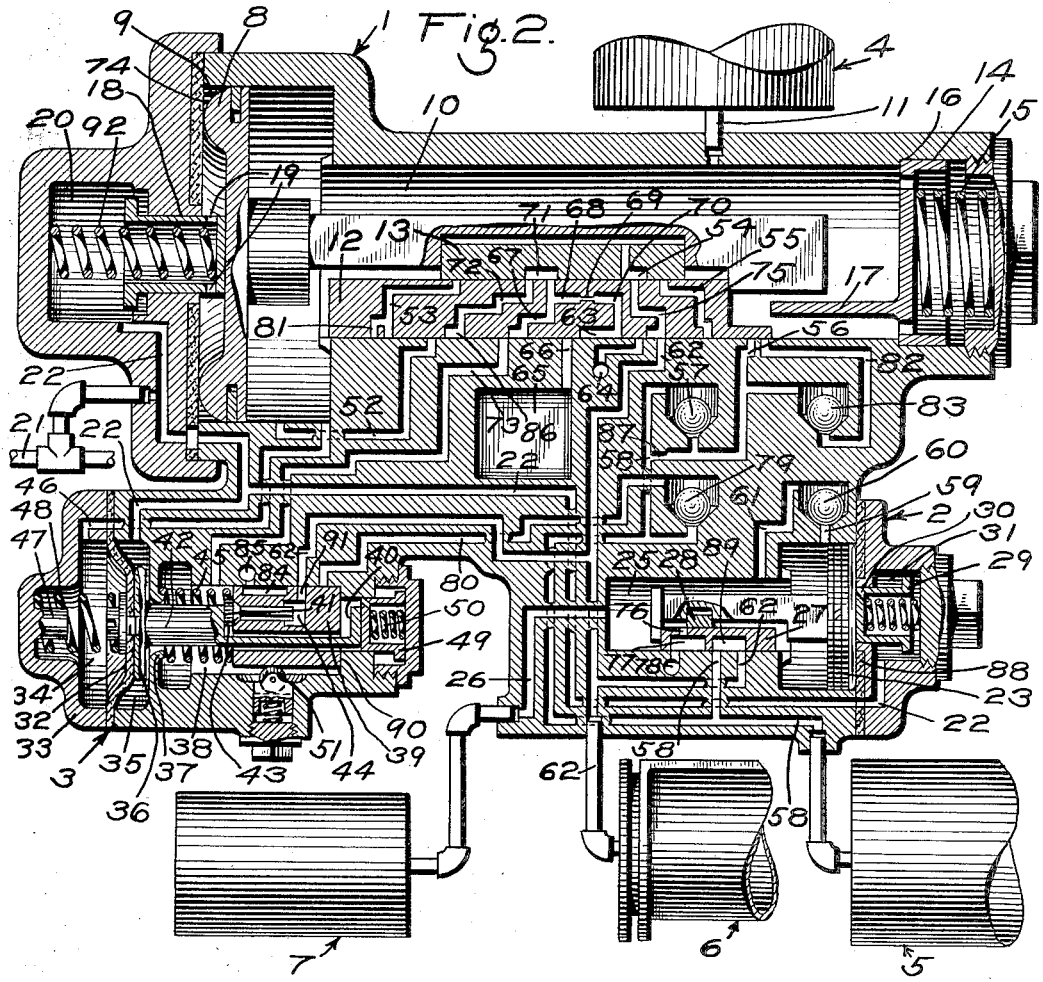
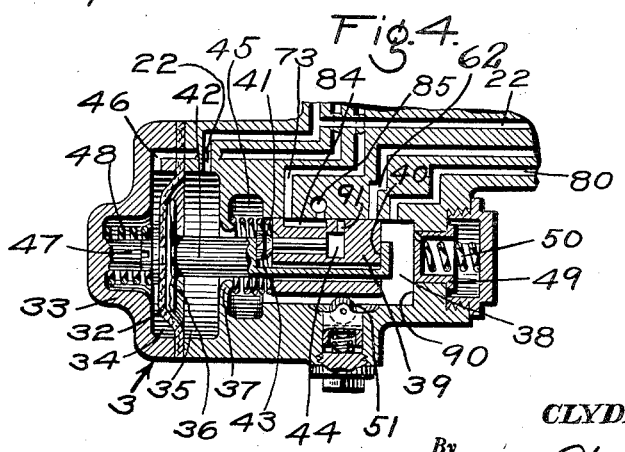
INVENTOR.
CLYDE C. FARMER
By  *Wm. M. Cady*
ATTORNEY.

Patented Mar. 10, 1936

2,033,462

UNITED STATES PATENT OFFICE 2,033,462

FLUID PRESSURE BRAKE

Clyde C. Farmer, Pittsburgh, Pa., assignor to The Westinghouse Air Brake Company, Wilmerding, Pa., a corporation of Pennsylvania Application July 14, 1931, Serial No. 550,685

17 Claims. (Cl. 303—66)

This invention relates to fluid pressure brakes, and more particularly to the type adapted to operate in accordance with variations in pressure in a brake pipe.

In charging the usual fluid pressure brake equipment on a train, fluid under pressure is supplied to the brake pipe at the head end of the train and flows therefrom to the rear end of the train. Due to the resistance to the flow of fluid through the brake pipe, the rate at which the brake pipe charges, especially at the end of a long train, is relatively slow.

In order to augment the charging of the brake pipe at the rear end of the train, it is customary to first move the usual engineer's brake valve device to release position in which fluid at the high pressure carried in the main reservoir is supplied directly to the brake pipe for a certain period of time after which the engineer's brake valve device is turned to running position in which the pressure of fluid supplied to the brake pipe is governed by the usual feed valve device.

Means have heretofore been proposed for further augmenting the charging of the brake pipe in releasing the brakes after an emergency application, such as for example as disclosed in my pending application, Serial No. 487,988, filed October 11, 1930. According to this application, the brake cylinder, which is charged with fluid under pressure in effecting an emergency application of the brakes, is connected to the brake pipe in releasing the brakes after an emergency application. Fluid under pressure is thereby permitted to flow from the brake cylinder to the brake pipe, and since this occurs on each car in a train, the rate at which brake pipe pressure is increased to effect a release of the brakes is materially hastened.

One object of my invention is to provide improved means for venting fluid under pressure from the brake cylinder to the brake pipe in releasing the brakes after an application of the brakes.

Another object of my invention is to provide means which operates in releasing the brakes after an application to first vent fluid from the brake cylinder to the brake pipe, and upon a predetermined increase in brake pipe pressure to close communication from the brake cylinder to the brake pipe and open another communication through which fluid is vented from a normally charged reservoir to the brake pipe.

Other objects and advantages will appear in the following more detailed description of the operation of my invention.

Figure 3:
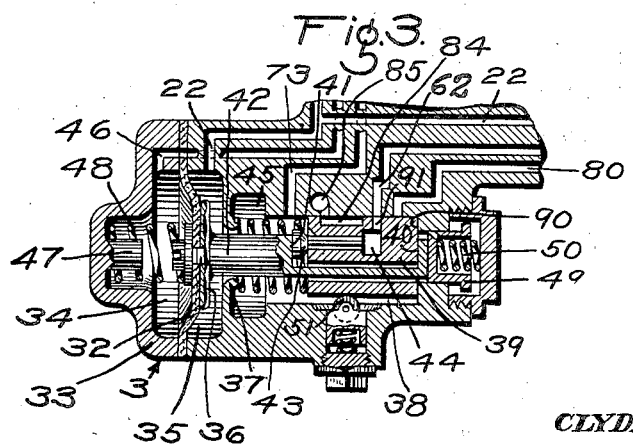

In the accompanying drawings; Fig. 1 is a diagrammatic view, mainly in section, of a fluid pressure brake equipment embodying my invention and showing the devices in their release position; Fig. 2 is a diagrammatic view of the equipment shown in Fig. 1 but with the various devices shown in application position; Fig. 3 is a diagrammatic view of the charging valve portion of the brake equipment shown in Fig. 1 but with the parts shown in the position initially assumed in releasing after an emergency application of the brakes; and Fig. 4 is similar to Fig. 3 but with the parts shown in the position assumed at the head end of the train in releasing after a service and after an emergency application of the brakes.

As shown in the drawings, the brake equipment comprises a triple valve device 1 or other brake controlling valve device, an emergency valve device 2, a charging valve device 3, an auxiliary reservoir 4, an emergency reservoir 5, a brake cylinder 6, and a quick action chamber or reservoir 7.

The triple valve device 1 comprises a piston 8 having at one side a chamber 9 connected to the brake pipe 21 and having at the other side a chamber 10 connected to the auxiliary reservoir 4 through a passage and pipe 11, and containing a main slide valve 12 and an auxiliary slide valve 13 adapted to be operated by said piston. Slidably mounted in one end of chamber 10 is a stop member 14 subject to the pressure of a spring 15 for urging said member into engagement with a shoulder 16. Projecting from the member 14 is a finger 17 adapted to engage the end of the main slide valve 12. Projecting into chamber 9 is a spring-pressed stop 18 having ports 19 for establishing communication from said chamber to chamber 20 which is open to the brake pipe 21 through a passage 22.

The emergency valve device comprises a piston 23 having at one side a chamber 24 and at the other side a chamber 25 connected to the quick action reservoir 7 through a passage and pipe 26, and containing a main slide valve 27 and an auxiliary slide valve 28 adapted to be operated by said piston. Projecting into piston chamber 24 is a spring-pressed stop 29 having a port 30 which is adapted to establish communication from piston chamber 24 to chamber 31 which is open to the brake pipe 21 through passage 22.

The charging valve device 3 comprises a flexible diaphragm 32 mounted between a face on the casing and a cover plate 33. The diaphragm 32 has at one side a chamber 34 and at the opposite side a chamber 35. Secured to the diaphragm 32 in chamber 35 is a diaphragm follower plate 36 having a stem 42 for operating a slide valve 39. The slide valve 39 is contained in a valve chamber 38 and is loosely mounted between spaced shoulders 40 and 41 on the stem 42. The stem 42 freely extends through an aperture in a partition wall 37 which separates chamber 35 from chamber 38.

Carried by the slide valve 39 is a poppet valve 43 for controlling communication between a chamber 44 in the slide valve and the valve chamber 38. Said poppet valve is so arranged in the slide valve in relation to shoulder 41 on the diaphragm stem 42 as to be engaged by said shoulder and pressed into engagement with its seat under certain conditions of operation as will be hereinafter described. A spring 45 is interposed between the partition wall 37 and one end of slide valve 39 for urging the slide valve into engagement with shoulder 40 of the diaphragm stem 42.

Chamber 34 of the charging valve device is connected to a passage 46 leading to valve chamber 10 and contains a stop 47 for limiting deflection of diaphragm 32 toward the left hand, such deflection being opposed by a spring 48.

The valve chamber 38 of the charging valve device is open to the brake pipe 21 through chamber 35 and passage 22. Projecting into chamber 38 in line with the stem 42 is a movable stop member 49 subject to the pressure of spring 50 and adapted to engage the stem 42. For holding the slide valve 39 seated, said slide valve is subjected to the pressure of a spring-pressed roller 51.

In operation, to initially charge the brake equipment with fluid under pressure, fluid under pressure is supplied to brake pipe 21 in the usual manner and flows therefrom through passage 22, chamber 20, and ports 19 in the spring-pressed stop 18 to piston chamber 9. With the piston 8 in the release position shown in Fig. 1, fluid under pressure flows from piston chamber 9 through passage 52, port 53 in slide valve 12 to valve chamber 10 and from thence through passage and pipe 11 to the auxiliary reservoir 4. From valve chamber 10, fluid under pressure flows through port 54 in the auxiliary slide valve 13, port 55 in the main slide valve 12, passage 56, past a check valve 57 and through passage and pipe 58 to the emergency reservoir 5. In this manner, the auxiliary reservoir 4 and emergency reservoir 5 are charged with fluid under pressure to the pressure carried in the brake pipe 21.

Fluid under pressure also flows from the brake pipe passage 22 to chamber 31 of the emergency valve device 2 and from thence through port 30 in the stop member 29 to piston chamber 24. With the emergency piston 23 in the release position shown in Fig. 1, fluid under pressure flows through passage 59, past check valve 60 and through passage 61 to valve chamber 25 and from thence through passage and pipe 26 to quick action chamber or reservoir 7, thereby charging said reservoir to brake pipe pressure.

From valve chamber 10 fluid under pressure flows through passage 46 to diaphragm chamber 34 of the charging valve device 3. Chamber 35 at the opposite side of diaphragm 32 being open to the brake pipe 21 through passage 22 is charged with fluid at brake pipe pressure. The opposing fluid pressures acting on diaphragm 32 being thus normally equal, spring 48 holds said diaphragm in the position shown in Fig. 1 of the drawings, in which position the diaphragm follower stem 42 engages stop 49, and spring 45 maintains slide valve 39 in engagement with shoulder 40 of said stem.

With the triple valve slide valves 12 and 13 in release position the brake cylinder 6 is open to the atmosphere through pipe and passage 62, cavity 63 in slide valve 12 and atmospheric passage 64. A quick service reservoir 65 is also open to the atmosphere through passage 66, port 67 in slide valve 12, port 68, choke 69, port 70, cavity 63 and atmospheric passage 64.

If it is desired to effect a service application of the brakes, fluid under pressure is gradually vented from the brake pipe 21 and the connected triple valve piston chamber 9, emergency valve piston chamber 24 and diaphragm chamber 35 of the charging valve device.

When the pressure in the triple valve piston chamber 9 is thus reduced a predetermined degree, the higher auxiliary reservoir pressure in valve chamber 10 moves the piston 8 and slide valves 12 and 13 toward the left hand. The initial movement of piston 8 and slide valve 13 is relative to the main slide 12 and is adapted to cause a cavity 71 to connect port 67 to a port 72 in the main slide valve 12. Port 72 registers with a passage 73 which is normally open to the charging valve chamber 38, so that fluid under pressure is permitted to flow from chamber 38 through passage 73, port 72 in slide valve 12, cavity 71 in slide valve 13, port 67 and passage 66 to the quick service reservoir 65. Chamber 38 of the charging valve device being at all times in communication with brake pipe 21 through chamber 35 and passage 22, fluid under pressure flows from the brake pipe to chamber 38 and thence to quick service chamber 65, so as to locally effect a quick service reduction in brake pipe pressure in the usual manner. While fluid under pressure is being thus vented to the quick service chamber 65, there is a slight flow to the atmosphere from port 67 through the quick service chamber exhaust port 68, choke 69, port 70 and atmospheric passage 64, but this is so controlled by choke 69 as to not materially effect the quick service action.

When the pressure differential on piston 8 is increased by a further reduction in brake pipe pressure, the piston 8 moves the main slide valve 12 with the auxiliary slide valve 13 to application position, in which the piston 8 engages a gasket, as shown in Fig. 2.

In application position of the slide valves 12 and 13, port 54 in slide valve 13 registers with port 75 in slide valve 12, port 75 in turn registering with the brake cylinder passage 62, so that fluid under pressure is permitted to flow from valve chamber 10 and the connected auxiliary reservoir 4 to the brake cylinder 6 and effect an application of the brakes.

When the brake pipe pressure in the emergency piston chamber 24 is reduced to slightly below the quick action chamber pressure in valve chamber 25, the emergency piston 23 moves the auxiliary slide valve 28 relative to the main slide valve 27 so as to uncover port 76 in the main slide valve 27. This permits fluid under pressure to flow from the valve chamber 25 and the connected quick action chamber 7 through the port 76 to cavity 77 and thence through passage 78 to the atmosphere, thus reducing the pressure in valve chamber 25 at substantially the same rate as the brake pipe pressure is reduced in chamber 24. This prevents further increase in the fluid pressure differential on piston 23, and movement of said piston ceases.

The charging valve diaphragm 32 is subject in chamber 34 to auxiliary reservoir pressure and in chamber 35 to brake pipe pressure. In effecting a service application of the brakes, the reduction in auxiliary reservoir pressure in chamber 34 follows the reducing brake pipe pressure in chamber 35 sufficiently close, that insufficient pressure differential is obtained on said diaphragm for deflecting it against the opposing pressure of spring 50. In other words, the charging valve device 3 remains in its normal position as shown in Fig. 1, when a service application of the brakes is effected.

In order to effect a release of brakes after a service application, fluid under pressure is supplied to the brake pipe 21 and from thence to the triple valve piston chamber 9, the emergency valve piston chamber 24 and diaphragm chamber 35 of the charging valve device 3.

In releasing the brakes, the usual brake valve device on the locomotive is first turned to the release position to supply fluid at high pressure directly from the usual main reservoir to the brake pipe 11, and after a certain lapse of time, the brake valve device is turned to running position in which the pressure of fluid supplied to the brake pipe is reduced to that normally carried in the brake pipe by operation of the usual feed valve device.

The brake pipe offers considerable resistance to the flow of fluid under pressure, and consequently in charging the brake pipe, the rate of increase in brake pipe pressure and the pressure obtained in the brake pipe at the head end of the train, adjacent the source of supply, is higher than obtained toward the rear of the train.

The increase in brake pipe pressure in piston chamber 9 shifts the triple valve piston 8 and slide valves 12 and 13 to release position shown in Fig. 1, in which position, fluid under pressure flows from piston chamber 8 through passage 52 and port 53 in slide valve 12 to valve chamber 10 and thence through pipe 11 to the auxiliary reservoir 4.

The flow capacity of passage 52 is such that at the head end of the train the brake pipe pressure in piston chamber 9 builds up more rapidly than the pressure of fluid in valve chamber 10 and a pressure differential is thus obtained on piston 8 sufficient to move said piston and the slide valves 12 and 13 from release position to an inner position. This movement acts through finger 17 to shift the stop member 14 and compress spring 15.

In the charging valve device 3, the rate of increase in brake pipe pressure in chamber 35 at the head end of the train being faster than the rate of increase in auxiliary reservoir pressure in chamber 34, a pressure differential is obtained on the diaphragm 32 which deflects the diaphragm toward the left hand and moves the slide valve 39 to the position shown in Fig. 4. This permits fluid under pressure to flow from the charged emergency reservoir 5 to the brake pipe 21 through passage 58, past a check valve 79, through passage 80 to chamber 38 of the charging valve device, and from chamber 38 through the aperture in partition wall 37 to chamber 35 which is connected through passage 22 to brake pipe 21. The flow of fluid under pressure from the emergency reservoir 5 to the brake pipe, as just described, supplements the supply of fluid under pressure to the brake pipe from the usual brake valve device, and consequently augments the charging of the brake pipe.

After equalization of pressures in the brake pipe and emergency reservoir, the brake pipe continues to charge from the usual brake valve device and to prevent back flow from the brake pipe to the emergency reservoir the check valve 79 is provided.

In the inner position of the triple valve device, fluid under pressure continues to flow from the piston chamber 9 to valve chamber 10 and auxiliary reservoir 11 through passage 52, but such flow is at a reduced rate, since a branch port 81 from port 53 registers with passage 52, and port 81 is of smaller flow area than port 53. In the inner position of the slide valves 12 and 13, port 54 in slide valve 13 registers with port 55 in slide valve 12, port 55 in turn registering with a passage 82, so that when the auxiliary reservoir pressure in valve chamber 10 becomes increased to a degree above the reduced pressure in the emergency reservoir 6, fluid under pressure flows from valve chamber 10 through ports 54 and 55, passage 82, past check valve 83, through passage 56, past check valve 57 to passage 58 and from thence to the emergency reservoir 5, thereby recharging said reservoir. The check valve 83 is provided to prevent flow from the emergency reservoir to the valve chamber 10 and auxiliary reservoir 4 when the triple valve device is in the inner position, so as to obtain as great a flow as possible from the emergency reservoir to the brake pipe, as above described.

Fluid under pressure is vented from brake cylinder 6 in the inner position of slide valve 12 by way of pipe and passage 62, cavity 63 in said slide valve and atmospheric passage 64, so as to effect a release of the brakes. Also, fluid under pressure is vented from the quick service chamber 65 to the atmosphere through passage 66, port 67 in slide valve 12, port 68, choke 69, port 70, cavity 63 and atmospheric passage 64.

When the charging valve device 3 is in the position shown in Fig. 4, passage 73 is connected through cavity 84 to an atmospheric passage 85. With the triple valve in the release position shown in Fig. 1, and in the inner position, passage 73 is connected to port 72 in the slide valve 12. Port 72 is lapped by the auxiliary slide valve 13 and terminates at the seating face of slide valve 12 in an enlarged portion or cavity 86 adapted to expose a predetermined area of the seating face of said slide valve to atmospheric pressure in passage 73. By this means, the pressure with which the slide valve 12 is pressed into engagement with its seat is increased over normal, so that the high brake pipe pressure acting through passage 52 on the seating face of said slide valve will not lift or blow the slide valve 12 from its seat during the charging of the brake pipe at the head end of the train.

It will here be noted that passage 73, which is normally connected to the brake pipe, is employed for quick service operation in effecting an application of the brakes, but in effecting a release of the brakes, as well as in initially charging the brake equipment, if the brake pipe pressure increases above the auxiliary reservoir pressure a predetermined degree, such for example, as three pounds, the charging valve device 3 is operated to close communication from the brake pipe to passage 73 so as to prevent brake pipe pressure from acting on the seating surfaces of the slide valves 12 and 13 and causing said slide valves to be unseated.

When the usual brake valve device is moved from release position to running position, the pressure in the brake pipe 21 at the head end of the train reduces to or somewhat below the pressure of fluid supplied by the feed valve device and if below, gradually builds up to the setting of the feed valve device.

With the brake valve device in running position, the pressure differential acting on the triple valve piston 8 and diaphragm 32 of the charging valve device reduces sufficiently for the respective springs 15 and 48 to return the devices to the normal position shown in Fig. 1.

With the triple valve device in the normal or full release position, fluid under pressure flows from piston chamber 9 to valve chamber 10 and the auxiliary reservoir through passage 52 and port 53 in slide valve 13, and from chamber 10 through port 54 in slide valve 13, port 55 in slide valve 12, passage 56, past check valve 57 and through passage 58 to the emergency reservoir 5. Said reservoirs are thereby charged to brake pipe pressure. The atmospheric connections to the brake cylinder 6 and quick service reservoir 65 are maintained as above described, so that a complete release of brakes occurs.

When the charging valve diaphragm 32 is returned to its normal position, spring 45 shifts the slide valve 39, maintaining said slide valve in engagement with shoulder 40 on the diaphragm stem 42. In the normal position of slide valve 39, passage 73 is uncovered so that fluid at brake pipe pressure is supplied from valve chamber 38 is supplied through said passage to the seating face of the slide valves 12 and 13, thereby reducing the seating pressure of said slide valves to normal.

At the rear end of the train where the rate of charging of the brake pipe is slower than at the front end, the charging valve device is not moved from the normal position shown in Fig. 1. The triple valve device 1 however, is moved from application position to full release position shown in Fig. 1.

In full release position of the triple valve device, fluid flows from piston chamber 9 through passage 52 and port 53 in the slide valve 12 to valve chamber 10 and to the auxiliary reservoir. At the same time fluid under pressure flows from the charged emergency reservoir 5 through passage 58, choke 87, passage 56, port 55 in the main slide valve 12 and port 54 in the auxiliary slide valve 13 to valve chamber 10 and auxiliary reservoir 4, thereby aiding in charging the auxiliary reservoir. When the emergency reservoir pressure reduces to equalization with auxiliary reservoir pressure, both reservoirs are charged up to brake pipe pressure by fluid under pressure supplied from the brake pipe to valve chamber 10, fluid flowing from valve chamber 10 to the emergency reservoir through ports 54 and 55, passage 56, past check valve 57 and through passage and pipe 58. In the full release position of the triple valve device at the rear end of the train, fluid under pressure is vented from the brake cylinder 6 and quick service reservoir 65 in the same manner as hereinbefore described.

In releasing the brakes, the increase in brake pipe pressure in piston chamber 24 shifts the emergency piston 23 and auxiliary slide valve 28 back to release position, in which the valve chamber 25 and quick action chamber 7 are recharged with fluid under pressure from the brake pipe 21 by flow from piston chamber 24 through passage 59, past the check valve 60 and through passage 61.

If it is desired to effect an emergency application of the brakes, fluid under pressure is suddenly vented from the brake pipe 21 and consequently from the triple valve piston chamber 9, the emergency valve piston chamber 24 and diaphragm chamber 35 of the charging valve device 3.

The sudden reduction in pressure in piston chamber 9 permits auxiliary reservoir pressure in valve chamber 10 to shift the piston 8 and slide valves 12 and 13 to their application position shown in Fig. 2, in which position fluid under pressure is permitted to flow from the auxiliary reservoir 4 to the brake cylinder as in effecting a service application of the brakes. The sudden reduction in brake pipe pressure in the emergency piston chamber 24 exceeds the venting capacity of port 76 in the emergency slide valve 27 and permits quick action chamber pressure in valve chamber 25 to shift the emergency piston 23 and slide valves 27 and 28 to emergency position shown in Fig. 2, in which position piston 23 engages a gasket 88. In emergency position of the main slide valve 27, a cavity 89 connects passage 58 from the emergency reservoir 5 to the brake cylinder passage 62, so that fluid under pressure from the emergency reservoir 5 is permitted to equalize into the brake cylinder 6 with fluid under pressure from the auxiliary reservoir which is connected to the brake cylinder through the triple valve device 1, as above described. It is thus evident that a higher brake cylinder pressure is obtained in effecting an emergency application of the brakes than is obtained in effecting a service application of the brakes, since both the auxiliary reservoir and emergency reservoir are connected to the brake cylinder, whereas in effecting a service application of the brakes, the emergency reservoir is isolated and only the auxiliary reservoir is connected to the brake cylinder.

In emergency position of the emergency valve device, fluid under pressure gradually flows from valve chamber 25 and the connected quick action reservoir 7 to the atmosphere through port 76 and cavity 77 in slide valve 27 and atmospheric passage 78. When the pressure in valve chamber 25 is thus reduced to a low degree, the spring-pressed stop 29 overcomes the reduced pressure in valve chamber 25 and shifts the piston 23 and slide valves 27 and 28 back to emergency lap position, in which the emergency reservoir passage 58 is disconnected from the brake cylinder passage 62, but this does not occur until after equalization of fluid under pressure from the emergency reservoir into the brake cylinder.

The venting of fluid under pressure from diaphragm chamber 35 of the charging valve device 3 upon an emergency reduction in brake pipe pressure permits auxiliary reservoir pressure in chamber 34 to deflect diaphragm 32 toward the right to emergency position, as shown in Fig. 2, in which position the stop member 49 is moved toward the right hand, compressing spring 50, this movement being limited by the engagement of slide valve 39 with a shoulder 90 in the casing.

With the charging valve device in the emergency position, chamber 44 in slide valve 39 is connected by a port 91 to the brake cylinder passage 62, and the poppet valve 43 is pressed into engagement with its seat by shoulder 41 of the diaphragm operated stem 42.

It will now be noted that after the brakes are applied in emergency, the triple valve device is held in engagement with gasket 74 by auxiliary reservoir pressure in valve chamber 10, which pressure is opposed only by the pressure of a light spring 92. The emergency valve device is in emergency lap position, the fluid pressures acting on the opposite sides of the piston 23 being substantially equal to that of the atmosphere. The charging valve device 3 is held in the position shown in Fig. 2 by auxiliary reservoir pressure in diaphragm chamber 34. In this position of the charging valve device, the spring 50 is compressed. This spring 50 is adapted to exert a considerable pressure on the operating stem 42, so that in releasing the brakes the charging valve device 3 will operate in advance of the triple valve device to aid in recharging the brake pipe.

In order to effect a release of the brakes after an emergency application fluid under pressure is supplied to the brake pipe by operation of the usual brake valve device on the locomotive. When the brake pipe pressure acting in diaphragm chamber 35 of the charging valve device 3 is thus increased a predetermined degree, spring 50 moves the stem 42 and connected diaphragm 32 from the position shown in Fig. 2 to the position shown in Fig. 3. In this latter position, the operating shoulder 40 of the stem 42 engages the slide valve 39 but due to the resistance to movement of said slide valve, further movement of stem 42 and diaphragm 32 toward the left hand temporarily ceases.

The movement of the charging valve diaphragm 32 and stem 42 relative to slide valve 39 removes the seating pressure on poppet valve 43 which permits fluid under pressure in chamber 44 to push said poppet valve from its seat, thereby permitting fluid under pressure to flow from brake cylinder 6 through pipe and passage 62, chamber 44, past poppet valve 43 to chamber 38 and thence to chamber 35, and from chamber 35 through passage 22 to the brake pipe 21. The triple valve slide valves 12 and 13 being still in application position, as shown in Fig. 2, fluid under pressure flows from valve chamber 10 and auxiliary reservoir 4 through port 54 in slide valve 13, port 55 in slide valve 12 and from thence through passage 62 to the brake pipe 21 with fluid under pressure from the brake cylinder 6. By thus supplying fluid under pressure from both the brake cylinder and auxiliary reservoir to the brake pipe, the rate of charging the brake pipe is increased over that effected by the supply of fluid under pressure from the usual brake valve device. This action occurs on each car in a train, so that the brake pipe pressure on the entire train is rapidly built up to a predetermined degree. It will however, be noted that at this time fluid under pressure is not vented from the emergency reservoir 5 to the brake pipe for the reason that said reservoir is cut off from the brake cylinder 6 by the emergency slide valve 27.

After the back dumping of fluid under pressure from the brake cylinder 6 and auxiliary reservoir 4 to the brake pipe 21 has thus occurred and the brake pipe pressure acting in chamber 35 of the charging valve device 3 is increased to within a predetermined degree of the reduced auxiliary reservoir pressure acting in diaphragm chamber 34 of said device, the pressure of spring 50 moves the parts of the charging valve device to the position shown in Fig. 1 in which the brake cylinder passage 62 is lapped. A further increase in brake pipe pressure at a rapid rate, as occurs at the head end of a train, then moves the charging valve device to the position shown in Fig. 4, in which position the increase in brake pipe pressure is further accelerated by flow of fluid at reduced pressure from the emergency reservoir to the brake pipe in the same manner as in releasing the brakes after a service application. The triple valve device is also moved, by this further increase in brake pipe pressure, first to the inner position and then to the release position shown in Fig. 1, in which positions the brake cylinder 6 is connected to the atmosphere to effect a complete release of the brakes, and fluid under pressure is supplied from the brake pipe to the auxiliary reservoir 4 and emergency reservoir 5 for charging said reservoirs.

After the charging valve device 3 is moved from the position shown in Fig. 2 to that shown in Fig. 1, it remains in the latter position at the rear end of the train where the rate of increase in brake pipe pressure is relatively slow. The triple valve device is moved from application position to release position after the operation of the charging valve device and in the release position, the brake cylinder 6 is connected to the atmosphere to effect a release of the brakes, and the auxiliary reservoir 4 and the emergency reservoir 6 are each charged with fluid under pressure in the same manner as in releasing the brakes after a service application.

The emergency valve device 2 is moved to the position shown in Fig. 1 of the drawings by the increase in brake pipe pressure at both the front and rear of the train. In this position, the valve chamber 25 and quick action chamber 7 are charged with fluid under pressure from the brake pipe through passage 59, past check valve 60 and through passage 61.

From the foregoing description of the operation of the invention, it will be noted that the charging valve device 3 operates in releasing the brakes after both a service application and an emergency application to accelerate the charging of the brake pipe and brake equipments on the train by connecting the emergency reservoir to the brake pipe at the head end of the train and to the auxiliary reservoir at the rear end of the train. This charging of brake equipments at both the front and rear ends of the train is further hastened in releasing the brakes after an emergency application by connecting the brake cylinder and auxiliary reservoir to the brake pipe prior to connecting the emergency reservoir to the brake pipe at the head end of the train and to the auxiliary reservoir at the rear end of the train.

The brake equipment is simplified to a certain extent by employing passage 73 at one time as a means through which fluid under pressure is vented from the brake pipe to effect a quick service reduction in brake pipe pressure and at another time for connecting a portion of the seating face of the main slide valve 12 and auxiliary slide valve 13 to the atmosphere so as to increase the pressure with which said slide valves are pressed into engagement with their seats.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a brake cylinder, of valve means operative upon a reduction in brake pipe pressure to supply fluid under pressure to said brake cylinder, spring means, and means operated by said spring means and an increase in brake pipe pressure for venting fluid under pressure from the brake cylinder to the brake pipe.

2. In a fluid pressure brake, the combination with a brake pipe and a brake cylinder, of valve means operative upon a reduction in brake pipe pressure to supply fluid under pressure to said brake cylinder, a valve for controlling communication through which fluid under pressure is vented from said brake cylinder to said brake pipe, fluid pressure means for seating said valve upon a reduction in brake pipe pressure, and resilient means for operating said fluid pressure means upon an increase in brake pipe pressure to permit said valve to unseat.

3. In a fluid pressure brake, the combination with a brake pipe and a brake cylinder, of valve means operative upon a reduction in brake pipe pressure to supply fluid under pressure to said brake cylinder, a valve controlling communication from the brake cylinder to the brake pipe and subject to brake cylinder pressure tending to open the valve, an abutment for controlling said valve and operative upon a reduction in brake pipe pressure to seat said valve for closing said communication, and means operative upon an increase in brake pipe pressure for operating said abutment to permit said valve to unseat.

4. In a fluid pressure brake, the combination with a brake pipe, an auxiliary reservoir and a brake cylinder, of valve means operative upon a reduction in brake pipe pressure to supply fluid under pressure from said auxiliary reservoir to said brake cylinder and operative upon an increase in brake pipe pressure to vent fluid under pressure from said brake cylinder to the atmosphere, a valve device subject to the opposing pressures of said brake pipe and auxiliary reservoir and operative to vent fluid under pressure from said brake cylinder to said brake pipe, and means for operating said valve device in advance of said valve means upon an increase in brake pipe pressure.

5. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, a valve for controlling communication from said brake cylinder to said brake pipe and subject to brake cylinder pressure tending to unseat said valve, an abutment subject to the opposing pressures of the brake pipe and auxiliary reservoir and operative upon a reduction in brake pipe pressure to seat said valve for closing said communication, and a spring for operating said abutment in advance of the operation of said valve means upon an increase in brake pipe pressure for permitting said valve to unseat.

6. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, a valve operative by brake cylinder pressure for venting fluid under pressure from said brake cylinder to said brake pipe, a movable abutment subject to the opposing pressures of said brake pipe and auxiliary reservoir and operative upon a reduction in brake pipe pressure to seat said valve, and a spring for operating said abutment in advance of the operation of said valve means upon an increase in brake pipe pressure for relieving said valve of seating pressure.

7. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, an additional reservoir normally charged with fluid under pressure, a valve device movable to a position in advance of the operation of said valve means upon an increase in brake pipe pressure for venting fluid under pressure from said brake cylinder to said brake pipe and movable to another position upon a further increase in brake pipe pressure to vent fluid under pressure from said additional reservoir to said brake pipe.

8. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, an additional reservoir normally charged with fluid under pressure, a valve device movable to a position in advance of the operation of said valve means upon an increase in brake pipe pressure for venting fluid under pressure from said brake cylinder and said auxiliary reservoir to said brake pipe and movable to another position upon a further increase in brake pipe pressure at a rapid rate for venting fluid under pressure from said additional reservoir to said brake pipe.

9. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, an additional reservoir normally charged with fluid under pressure, a valve device movable to a position in advance of the operation of said valve means upon an increase in brake pipe pressure for venting fluid under pressure from said brake cylinder to said brake pipe and movable to another position upon a further increase in brake pipe pressure to vent fluid under pressure from said additional reservoir to said brake pipe, and a spring for moving said valve device to the first mentioned position.

10. In a fluid pressure brake, the combination with a brake pipe, a brake cylinder, and an auxiliary reservoir, of valve means operated upon a reduction in brake pipe pressure to supply fluid under pressure from said auxiliary reservoir to said brake cylinder and upon an increase in brake pipe pressure to vent fluid under pressure from said brake cylinder to the atmosphere, and a valve device subject to the opposing pressures of the brake pipe and auxiliary reservoir and operative upon an increase in brake pipe pressure to establish a communication through which fluid under pressure is vented from said brake cylinder to said brake pipe.

11. In a fluid pressure brake, the combination with a brake pipe, a brake cylinder, an auxiliary reservoir, and another reservoir, of a brake controlling valve device operative upon a reduction in brake pipe pressure to supply fluid under pressure from said auxiliary reservoir to said brake cylinder and upon an increase in brake pipe pressure to vent fluid under pressure from said brake cylinder, a main valve having one position for establishing communication through which fluid under pressure is vented from said brake cylinder to said brake pipe and another position for venting fluid under pressure from said other reservoir to said brake pipe, an auxiliary valve associated with said main valve for controlling said communication, an abutment operative by the pressure of fluid in said auxiliary reservoir upon a reduction in brake pipe pressure to move said auxiliary valve to close said communication, and a spring for moving said abutment in advance of the operation of said brake controlling valve device upon an increase in brake pipe pressure for permitting said auxiliary valve to open said communication, said abutment being operative independently of said spring upon a further increase in brake pipe pressure to move said main valve to the position for venting fluid under pressure from said reservoir to said brake pipe.

12. In a fluid pressure brake, the combination with a brake pipe, and a reservoir, of a valve device having a chamber and having a passage normally open to the brake pipe, said valve device comprising a slide valve movable upon a reduction in brake pipe pressure to a position for venting fluid under pressure from said brake pipe through said passage to said chamber, and movable upon an increase in brake pipe pressure to lap said passage and to establish a communication through which fluid under pressure is supplied from said brake pipe to said reservoir, and valve means operative upon an increase in brake pipe pressure for opening said passage to the atmosphere.

13. In a fluid pressure brake, the combination with a brake pipe, and a reservoir, of a valve device having a chamber and having a passage normally open to the brake pipe, said valve device comprising a slide valve movable upon a reduction in brake pipe pressure to a position for venting fluid under pressure from said brake pipe through said passage to said chamber, and movable upon an increase in brake pipe pressure to lap said passage and to establish a communication through which fluid under pressure is supplied from said brake pipe to said reservoir, an abutment subject to the opposing pressures of the brake pipe and said reservoir, a valve operated by said abutment upon an increase in brake pipe pressure over the pressure in said reservoir to connect said passaage to the atmosphere, and means operative upon substantial equalization of brake pipe pressure and reservoir pressure for moving said valve to connect said passage to said brake pipe.

14. In a fluid pressure brake, the combination with a brake pipe, and a reservoir, of a valve device having a chamber and having a passage normally open to the brake pipe, said valve device comprising a slide valve movable upon a reduction in brake pipe pressure to a position for venting fluid under pressure from said brake pipe through said passage to said chamber, and movable upon an increase in brake pipe pressure to lap said passage and to establish a communication through which fluid under pressure is supplied from said brake pipe to said reservoir, an abutment subject to the opposing pressures of the brake pipe and said reservoir, a valve operated by said abutment upon an increase in brake pipe pressure over the pressure in said reservoir to connect said passage to the atmosphere, means operative upon substantial equalization of pressures in said brake pipe and reservoir for moving said abutment, and other means for moving said valve upon movement of said abutment by its means.

15. In a fluid pressure brake, the combination with a brake pipe, of a brake controlling valve device operated upon a reduction in brake pipe pressure for venting fluid under pressure from the brake pipe through a passage, and a valve device operated upon an increase in brake pipe pressure for cutting off communication from the brake pipe through said passage.

16. In a fluid pressure brake, the combination with a brake pipe, of a brake controlling valve device operated upon a reduction in brake pipe pressure for venting fluid under pressure from the brake pipe through a passage for effecting a quick service reduction in brake pipe pressure, and a valve device operated upon an increase in brake pipe pressure for closing communication from the brake pipe to said passage and for venting said passage to the atmosphere.

17. In a fluid pressure brake, the combination with a brake pipe, of a brake controlling valve device comprising a movable abutment and a slide valve having a cavity and operated by said abutment upon a reduction in brake pipe pressure to vent fluid under pressure from the brake pipe through said cavity for effecting a quick service reduction in brake pipe pressure, another slide valve operative to close the communication from the brake pipe to said cavity, and another movable abutment operated upon an increase in brake pipe pressure for operating the second mentioned slide valve.

CLYDE C. FARMER.